(12) United States Patent
Abe

(10) Patent No.: US 6,345,308 B1
(45) Date of Patent: Feb. 5, 2002

(54) NETWORK COMPUTER SYSTEM AND METHOD FOR EXECUTING DATA SYNCHRONIZATION PROCESS THEREOF

(75) Inventor: Masaki Abe, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/257,937

(22) Filed: Feb. 26, 1999

(30) Foreign Application Priority Data

Feb. 27, 1998 (JP) .......................................... 10-047288

(51) Int. Cl.⁷ ............................................ C06F 15/177
(52) U.S. Cl. ...................... 709/248; 709/203; 707/101
(58) Field of Search ................................ 707/101, 202, 707/204; 709/203, 248; 714/4; 713/2

(56) References Cited

U.S. PATENT DOCUMENTS

| | | | | | |
|---|---|---|---|---|---|
| 5,778,389 A | * | 7/1998 | Pruett et al. | ................. | 707/204 |
| 5,884,325 A | * | 3/1999 | Bauer et al. | ................. | 707/201 |
| 5,893,116 A | * | 4/1999 | Simmonds et al. | ......... | 707/201 |
| 5,991,771 A | * | 11/1999 | Falls et al. | ................... | 707/202 |
| 6,151,674 A | * | 11/2000 | Takatani | ......................... | 713/2 |
| 6,163,855 A | * | 12/2000 | Shrivastava et al. | .......... | 714/4 |
| 6,175,918 B1 | * | 1/2001 | Shimizu | ........................ | 713/1 |
| 6,192,365 B1 | * | 2/2001 | Draper et al. | ............... | 707/101 |
| 6,269,371 B1 | * | 7/2001 | Ohnishi | ........................ | 707/10 |

* cited by examiner

*Primary Examiner*—Glenton B. Burgess
*Assistant Examiner*—Walter Benson
(74) *Attorney, Agent, or Firm*—Oblon, Spivak, McClelland, Maier & Neustadt, P.C.

(57) ABSTRACT

The network computer ("NC") stores a replica list in a local storage by an initial downloading of a synchronization list in a server computer as well as resource replicas that are necessary for mobile operation of the NC. When the NC returns to an on-line state to the server, the replication between the resource replicas in the NC and the server resources is performed with reference to the synchronization list and the replica list in the local storage. Even if a synchronous object in the server synchronization list has been modified during the mobile operation of the network computer, the NC can determine the modification in the replication process. This results in a reliable and flexible network computer system.

7 Claims, 10 Drawing Sheets

SYNC. LIST

| RESOURCE NAME | OPTION (PRIORITY) |
|---|---|
| A | S (SERVER) |
| B | NC (NETWORK COMPUTER) |
| C | UP (LATEST UPDATE DATA) |
| ⋮ | ⋮ |

*FIG. 8*

NETWORK COMPUTER SYSTEM AND METHOD FOR EXECUTING DATA SYNCHRONIZATION PROCESS THEREOF

BACKGROUND OF THE INVENTION

1. Field of the Invention

The present invention relates to a network computer system and a method for executing a reliable synchronization process thereof. More particularly, the present invention relates to a method for performing a reliable and flexible synchronization process between a server computer and a network computer to assure that the network computer can operate in a mobile environment.

Further, the present invention relates to a method for removing inconsistency that appears between resources of a server computer and resources of a network computer when the network computer is coupled to the server computer after functioning as a mobile computer.

2. Discussion of Background

In recent years, a network computer system has been developed as a novel computer architecture. The system includes a server computer and a plurality of client computers (referred to as network computers ("NCs")) that are coupled to the server computer through a network, such as a local area network ("LAN").

A characteristic feature of the network computer system is that the server computer only stores resources, such as an operating system ("OS"), application programs and data for processing, and the respective network computers do not individually store these resources. On an as-needed basis, a network computer simply downloads these resources from the server computer through a network. Consequently, the network computer system has advantages of flexibility for easily updating the OS and application programs as a whole system and of reducing overall cost of the computer system in comparison to constructing the system using a large number of conventional stand-alone personal computers. Current network computer systems can operate only while the network computers are coupled to a server computer through a network, such as a LAN, as shown in FIG. 2.

FIG. 2 depicts a network computer (12) that is constantly coupled to a server computer (11) through a LAN (10-1). When the network computer processes data, it downloads a program and data stored in the server. After processing the data, the network computer (12) must upload the updated data to the server in order to maintain consistency of the data. Thus the network computer must be always coupled to the server.

Recently, it has become desirable to use such a network computer as a mobile computer, i.e., off-line from the server. To use a network computer in a mobile environment, local storage is easily installed in a network computer for storing replicas of these resources, i.e., the OS, application programs and data in the server, for off-line processing by the network computer.

FIG. 3 illustrates a network computer having a mobile status capability. As discussed previously, the network computer (12) includes a local storage (24) for storing replicas of the programs and data in the server (11). While the network computer (12) is online, these resources are downloaded in the local storage (24) through the LAN (10-1). By using resource replicas Data (24-d) and Program (24-p) in the local storage (24), the network computer (12) processes data as if it were on-line even when the network computer is off-line from the server (11). Thus, the network computer (12) can be used as a mobile computer.

FIG. 3 illustrates an off-line network computer (12M). When a mobile operation is complete, the network computer is coupled to the server computer (11) and returns to an online state. For continuing the same operation that was executed in an off-line state, the computer system needs to perform a synchronization process to secure consistency between the updated Data (24M-d) in the network computer and the Data (11-d) in the Server (11). Accordingly, the updated Data (24M-d) in the network computer must be uploaded to the server computer (11).

However, there is a serious problem for performing such a synchronization process if the synchronization list in the server computer (11) is modified during the mobile operation of the network computer (12M). When a network computer processes data, as explained above, the network computer must use server resources that have been downloaded into the local storage in the network computer itself by referencing listed necessary objects in the synchronization list of the server computer. The synchronizing objects in the synchronization list of the server computer are intentionally defined and designated by a person who is responsible for controlling the system.

At an initial downloading stage of the resources from the server by referencing the synchronization list into the network computer, the downloaded data of the resource replicas into the local storage of the network computer maintain consistency with the data in the server resources. Then the network computer is logged-out from the network and attains an off-line state. While off-line, the network computer functions independently by using the resource replicas in the local storage only. Since the network computer does not access the server computer during mobile operation, it can not recognize modifications to data in the resources of the server computer made while the network computer is off-line.

However, while the network computer is off-line, it may become necessary to update or change resources in the server computer side. For example, modifications to the synchronization list or to application programs may become necessary in accordance with additions or deletions of commodities or price lists of the objects that are being handled in the system. If such a change in the server resources occurs during the mobile operation of the network computer, inconsistency between the contents of the server resources and the replica data of the network computer appears when the network computer is again coupled to the server.

When the network computer is again on-line, a synchronization process must be performed. The network computer uploads the data in the local storage that have been updated during the mobile operation to the server in accordance with the synchronizing objects that were initially designated in the synchronization list of the server. Consequently, even if an objective resource that was initially listed in the synchronization list has been deleted while the network computer was off-line, the updated data for the objective resource are uploaded to the server in the synchronization process. However, since the objective resource has already been deleted in the server computer, the data of the objective resource can not be updated even if it has been uploaded in the synchronization process.

This inconsistency between the server resources and the data in the network replicas may appear for other reasons, for example, if the contents of the synchronization objects are changed when another network computer or the application programs send a demand to change the objects. In these cases, it is necessary to avoid such inconsistencies between the server resources and the contents of the data in the network computer when the network computer has returned on-line to the server computer after it completes an off-line operation.

SUMMARY OF THE INVENTION

Accordingly, one object of the present invention is to solve the aforementioned problems of the conventional network computer system.

Another object of the present invention is to provide a novel network computer that can be operable as a mobile computer and a novel synchronizing method for resolving inconsistencies between server resources and resources of a network computer that appear after mobile operation of the network computer.

More particularly, an object of the present invention is to provide a network computer that is suitable for mobile usage and a method for increasing reliability and flexibility of a synchronization process that can be coordinated with a synchronization list in a server computer.

This may be accomplished by providing a network computer that includes a replica list of the synchronous list of the server computer. A method for performing a synchronization process according to the present invention is characterized in that it performs the synchronization process using both the synchronous list of the server computer and the replica list in the network computer.

Further, the network computer according to the present invention is characterized in that it includes means for determining contents for downloading/uploading between the server and the network computer by referencing both the server list and the replica list of the network computer.

For achieving these objects, the network computer system according to the present invention comprises a server computer and a plurality of network computers and at least one network for coupling between the server computer and the plurality of network computers, wherein the server computer stores resources including at least an operating system ("OS") and application programs and a synchronization list for identifying synchronous objects for downloading/ uploading the resources between the server computer and each of the network computers, the OS includes a synchronization process for controlling the downloading/uploading of resources, each of the network computers includes a local storage for storing the downloaded resources from the server computer and a replica list of the synchronization list in the server computer for performing the synchronization process after a mobile operation of the network computer and an OS memory area for storing the downloaded OS from the server computer, the OS memory area including a downloaded synchronization process for performing the synchronization process by referencing both the synchronization list in the server computer and the replica list in the local storage.

The network computer system according to the present invention is characterized in that the computer system includes a server computer, a plurality of network computers, and at least one network for coupling between the server computer and the plurality of network computers, wherein the server computer stores original resources having data including at least an OS and a synchronization list for identifying synchronous objects for replicating the resources for each of the network computers, the OS includes a synchronization process for the replication of the resources, and characterized in that each of the network computers includes a local storage for storing downloaded replicas of the original resources from the server computer to the network computer and a downloaded replica list of the synchronization list of the server computer for identifying synchronous objects for the replication; whereby, the network computer determines execution of the replication by referencing the synchronization list in the server computer and the replica list in the local storage in the network computer.

Further, the network computer system according to the present invention is characterized in that the local storage stores the replicas of the resources in the server and the replica list of the synchronization list in the server; further the network computer includes means for operating the network computer by using resource replicas stored in the local storage without accessing the server; means for comparing the synchronization list in the server and the replica list in the local storage at a replication stage in an online connection to the server; and means for performing the replication between the resources in the server and the resource replicas in the network computer based on the result of the comparison by the comparing means.

The network computer system according to the present invention is characterized in that the replication performing means includes means for determining execution of the replication by detecting whether or not the synchronization list in the server has been changed after the initial replication of resources to the network computer.

The network computer system according to the present invention is characterized in that the replication performing means updates the replica list in the local storage by downloading the synchronization list when it is changed during an off-line state of the computer.

The network computer system according to the present invention is characterized in that the synchronization list includes synchronizing object resources and an optional information attached to the respective resources for determining which has priority for the replication when both data in the server and the local storage have been changed during an off-line operation of the network computer.

The network computer system according to the present invention is characterized in that the replication performing means determines the replication by detecting changes of the data in the server and in the local storage based on the attached optional information.

The network computer system according to the present invention is characterized in that the synchronization list includes optional information for determining replication between the server computer and the local storage; and the replication performing means determines replication in accordance with the attached optional information.

The network computer system according to the present invention is characterized in that the computer system is operable in a first mode operation and a second mode operation, wherein the first mode operation is accomplished by using the resource replicas stored on the local storage during an off-line state from the server; and the second mode operation is accomplished by connecting to the server through an on-line network.

For the network computer system according to the present invention including a local storage for storing necessary downloaded resources from a server computer, a method for executing a replication process between the computer system and the server computer, comprises the steps of producing a replica list in the local storage by downloading a synchronization list in the server computer; and replicating resources between the computer system and the server computer by comparing the replica list in the local storage and the synchronization list in the server computer.

The method according to the present invention further includes the steps of detecting any changes of synchronizing object resources in the synchronization list in the server computer by comparing it with the replica list and determining execution of replication based on a result of the detecting step.

The method according to the present invention, further including a step of updating the replica list in the local storage by downloading the synchronization list from the server computer when the detecting step has detected that any one of the synchronizing object resources has been changed.

The method according to the present invention, wherein each of the synchronizing object resources in the synchronization list includes optional information for designating a priority for the replication between the synchronization list in the server computer and the local storage in the computer system, further including the step of determining replication in accordance with the optional information.

The method according to the present invention, wherein the determining step determines replication by detecting any deletion of the synchronizing objects from the synchronization list, and by using the optional information attached to the deleted synchronizing objects in the replica list.

According to the present invention, it is possible to realize a network computer that can be operable as a mobile computer of high reliability and flexibility since a possible inconsistency between data in a server and a network computer can be resolved by replication processes when the network computer has coupled to the server after the mobile operation.

BRIEF DESCRIPTION OF THE DRAWINGS

A more complete appreciation of the present invention and many of the attendant advantages thereof will be obtained as the same becomes better understood by reference to the following detailed description when considered in connection with the accompanying drawings, wherein

FIG. 8 is a diagram illustrating a synchronization list that includes optional information, according to the present invention;

DESCRIPTION OF THE PREFERRED EMBODIMENTS

Figure 1:
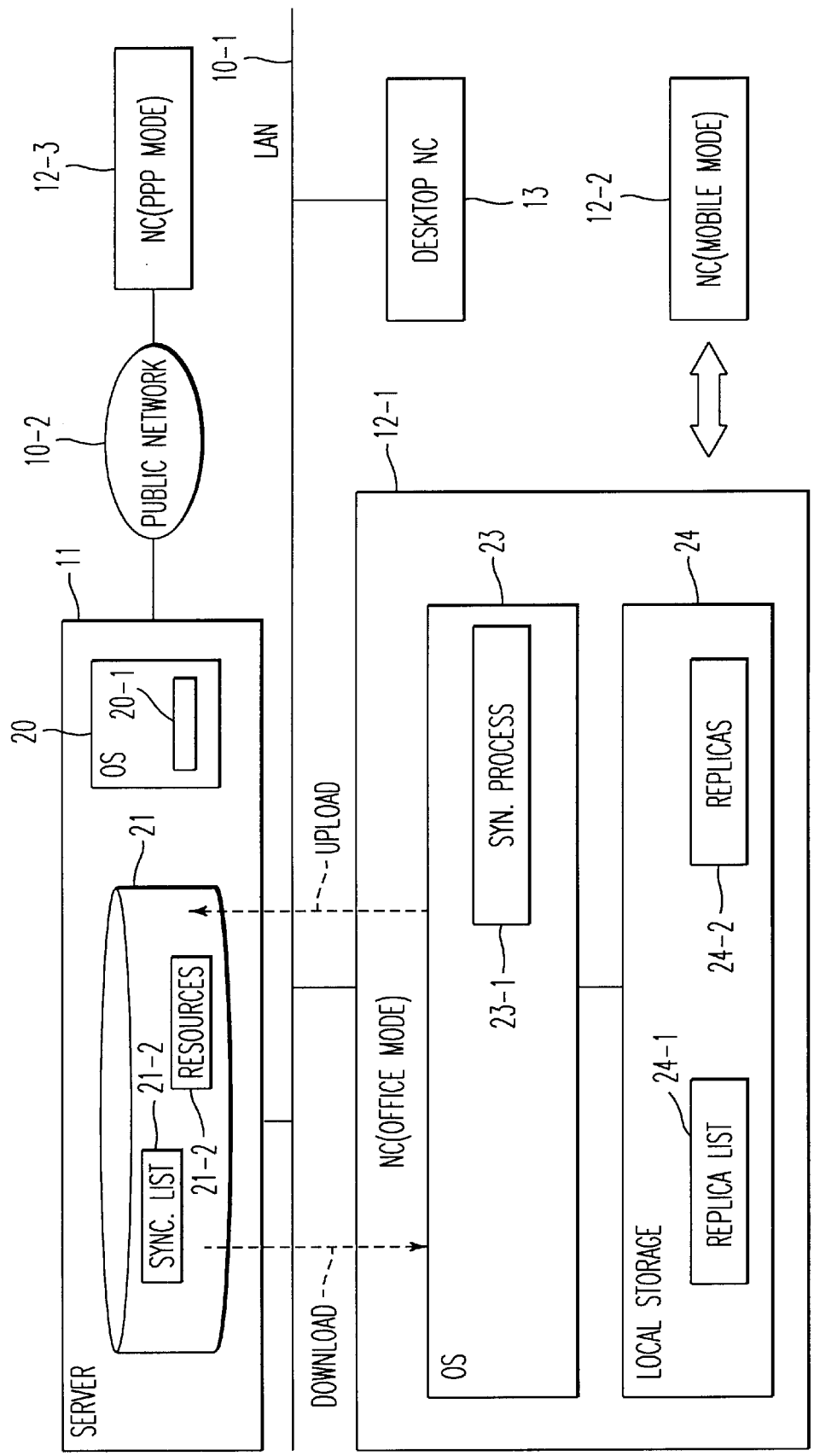
FIG. 1 is a block diagram illustrating the components of the network computer system according to the present invention.

Referring now to the drawings, wherein like numerals designate identical or corresponding parts throughout the several views, and more particularly to FIG. 1 thereof, there is illustrated a network computer system which includes a server computer (11) and a plurality of network computers (12-1), (12-2) and (12-3) that are respectively coupled to the server computer (11) through a Local Area Network ("LAN") (10-1) or a public network (10-2). For example, the network computer (12-1) is coupled to the server computer (11) through the LAN (10-1). The network computer (12-1) coupled in this way is called as an office mode computer.

The network computer (12-3) is remotely coupled to the server computer (11) through a public network (10-2) by a Point-to-Point Protocol (PPP). The network computer (12-3) coupled in this way is referred to as a PPP mode computer. The office mode and the PPP mode network computers are always coupled to the server computer (11) in on-line mode.

The network computer (12-2) in FIG. 1 illustrates an off-line mode of the network computer (12-2) after it is released from the network after downloading necessary resources for processing data from the server computer (11) through the network. Thus, the network computer (12-2) is in mobile mode.

In the network computer system, it is also possible to install a desk-top network computer (13) that is always coupled to the server computer (11) through the LAN (10-1). The server computer (11) stores resources (21-2) for data processing, and resources such as an OS (20) or application programs and data as a central control for the whole system. Each of the network computers downloads necessary resources from the server through the network on an as-needed basis.

The OS (20) in the server includes a synchronization process portion, such as, for example, a Text Editor, for executing the synchronization process with the network computer and a modification portion for a synchronization list (21-1). Further, a disk (21) in the server computer (11) stores and manages the synchronization list (21-1) that designates an objective list for the synchronization process with a network computer.

The respective network computers (12-1), (12-2) and (12-3) each include an OS storage portion (23) that stores a downloaded OS (20) from the server computer (11) during an on-line connection and a local storage portion (24) for storing a downloaded synchronization replica list (24-1) and the downloaded resource replicas (24-2) from the server computer (11). The local storage portion (24) may be constructed, for example, by a flash memory card or a hard disk.

When the network computer is off-line from the server computer, it becomes possible to process data using the synchronization list replicas (24-1) and resource replicas (24-2) stored in the local storage (24). It is possible, for example, to store the OS and the local storage in a common disk of the network computer by dividing it into an OS storage portion (23) and a local storage portion (24). It is also possible, for example, to store the local storage portion in a disk and to store the OS storage portion in a separate flash memory.

The downloaded resource replicas (24-1) and replica list (24-2) in the local storage portion (24) of the network computer are called a "daypack". When the OS and the daypack are stored in the same disk, it is possible to create ownership of the daypack storing area, as is explained further below.

The OS portion (23) downloaded in the OS portion of a local storage disk of the network computer from the server computer (11) includes a synchronous processing portion (23-1). The synchronous processing portion (23-1) performs download/upload operations between the resources (21-2) of the server computer (11) and the resource replicas (24-2) of the network computer local storage (24). As part of an initial logging-out operation, the synchronous processing portion (23-1) downloads all synchronizing objects lists that are written in the synchronization list (21-1) of the server computer (11) and makes a replica list (24-1) of the synchronization list in the local storage (24).

The synchronization process of the synchronous processing portion (23-1) of the network computer (12) is also performed as part of a logging-in operation. This log-in synchronization process is performed to maintain the same operation that is executed by the network computer in off-line mode, after returning to on-line mode. The resource replicas and the replica list downloaded in the network computer (12-1) are synchronized to the resources of the server computer (11) at the initial stage when the replicas are initially produced by the synchronization process.

From this synchronous state, the network computer (12-1) becomes off-line by logging-out from the network. While the network computer (12-2) works in off-line mode, the resources in the server computer (11) are typically updated or modified. In this case, the network computer needs to download the latest resources from the server computer (11) to the local storage (24) of the network computer (12-2) by returning to on-line mode by logging-in to the network. Also, when the contents in the resource replicas (24-2) of the network computer (12-2) are updated by processing data off-line, the network computer (12) needs to upload the latest data in the network computer (12-2) to the server computer (11) by returning to on-line mode by logging-in to the network. These downloading/uploading operations of the resources are necessary for securing a synchronous state between the resource replicas (24-1) of the network computer (12-1) and the resources (21-2) of the server computer (11).

The desktop network computer (13) does not need to provide local storage as described above because the desktop network computer (13) is always operable on-line.

Figure 2:
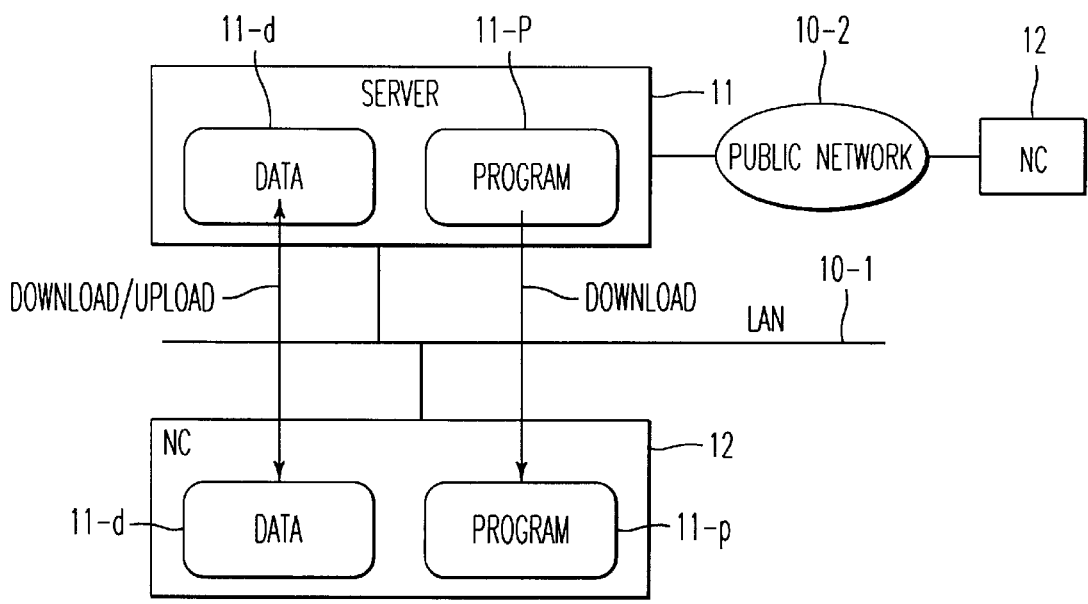
FIG. 2 is a block diagram illustrating a conventional on-line mode of the network computer system.

FIG. 2 illustrates an on-line network computer (12) which executes a downloaded program from the server computer (11) and uploads updated data to the server computer (11) each time it changes the data.

The on-line state operation modes of a network computer are divided into a LAN mode (office mode) or a PPP mode, depending upon a choice of network utilized. The PPP mode is used for remotely accessing a network computer (12) of the mobile mode to the server computer (11) through, for example, a public network, Integrated Services Digital Network ("ISDN"), or Personal Handy-phone System ("PHS").

Figure 3:
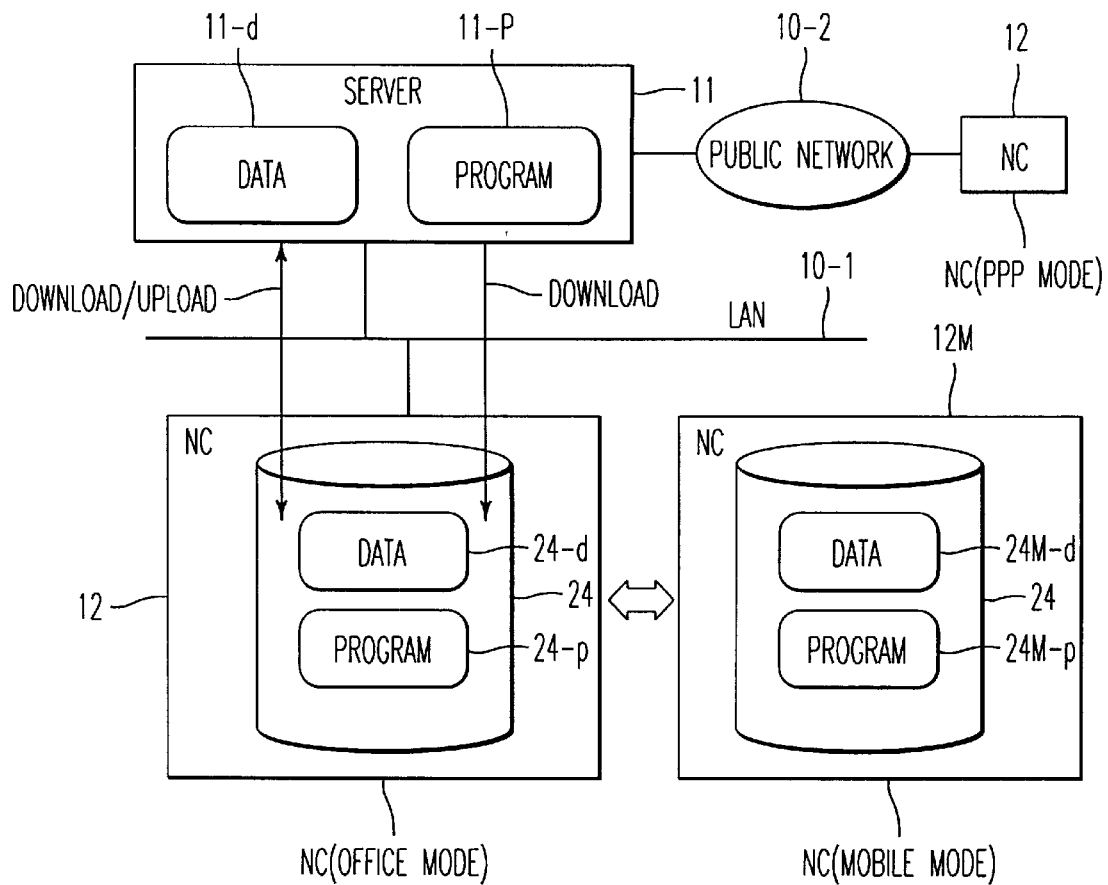
FIG. 3 is a diagram illustrating a necessary construction of the network computer for making it operational off-line from the server computer.

As illustrated in FIG. 3, the network computer (12) for using a mobile mode downloads a necessary program (11-p) and data (11-d) for producing the respective replicas, i.e., a data replica (24-d) and a program replica (24-p) in the local storage (24) while on-line by logging-in to a network, such as, for example, a LAN (10-1). As explained previously, the network computer (12M) can perform the same operations as are possible on-line even when it enters an off-line state by logging-out from the network, by using the replicas (24M-p) and (24M-d).

Figure 4:
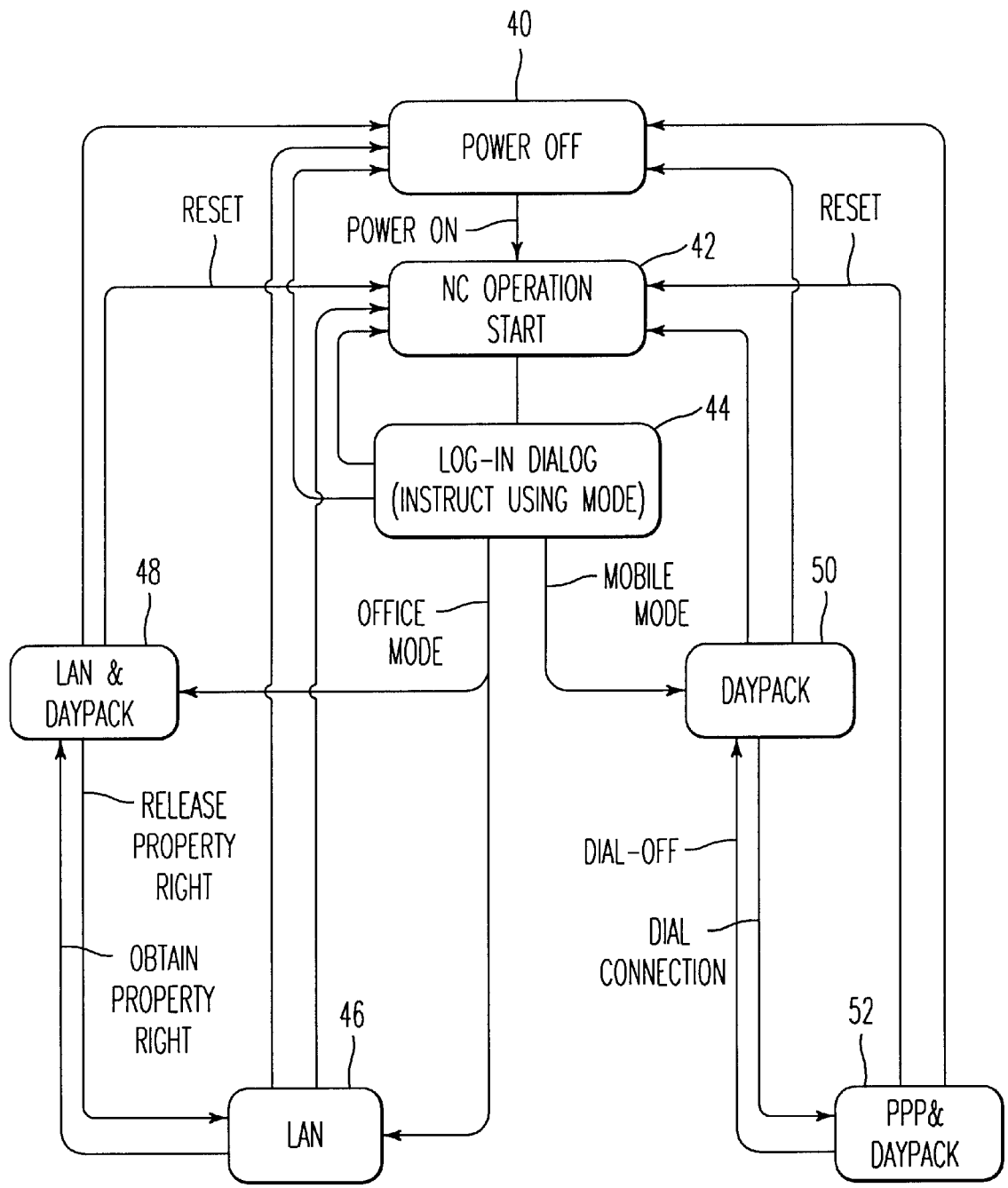
FIG. 4 is a diagram illustrating a transition of the network computer according to the present invention.

After finishing the mobile mode operation, when the network computer (12M) returns on-line by logging-in to the network, the data (24M-d) updated during the mobile mode processing of the network computer (12M) are uploaded to the server computer (11). The storing area of the replicas of program and data in the network computer (12) is referred to as a "daypack", as explained the previously. This daypack can be used while the network computer (12) is operating in office mode for pre-fetching the program and data in preparation for a mobile mode off-line operation. The downloading of the resources for the pre-fetch are executed as the initial synchronous process. Consequently, the operation modes of the network computer (12) are broadly classified into an office mode and a mobile mode. The respective broadly classified modes include more specified modes, as depicted in the followin:

I. Office mode
   (1) LAN mode
   (2) (LAN+daypack) mode
II. Mobile mode
   (1) Daypack mode
   (2) (PPP+daypack) mode
   (3) PPP mode FIG. 4 illustrates the transitions among the above operation modes of the network computer (12). Initially, when the network computer (12) enters a power ON state from a power OFF state (40) or when a reset signal enters during the power ON state, the system starts and begins the initializing process by the OS.

Then, either the office mode or the mobile mode is designated as the mode in use on a log-in dialog (44) displayed on a screen of the network computer (12). If the office mode is designated and logged-in, the operation mode is set to the LAN mode (46) or the (LAN+daypack) mode (48).

When the mobile mode is designated, the operation mode is set to the daypack mode (50). If the mobile computer of the daypack mode (50) is connected to the public network, it is set to (PPP+daypack) mode (52).

In order to establish the PPP mode, a network computer needs to input setting information for dialing-up the PPP connection. However, as the details of the dial-up connection are complicated and quite different from the features of the present invention, it is noted that these details are now well known and thus will not be described in detail herein.

The mechanism for designating the mode of use is included in the OS initializing process. In LAN mode (46), if a daypack exists which is owned by a user, it is automatically set to (LAN+daypack) mode (48). Further, it is also possible to set (LAN+daypack) mode (48) by obtaining the ownership of a daypack when no one has ownership of the daypack while in the LAN mode (46).

It is possible to resign the ownership of the daypack at any time while in LAN mode (46) or (LAN+daypack) mode (48). If ownership has been resigned while in (LAN+daypack) mode (48), it is set to LAN mode (46).

It is possible to use the operation modes discussed above by selecting either the office mode or the mobile mode during log-in. Further, it is possible to reset the system or enter the power OFF state from all of the operation modes. When the system is reset, the OS initializes its data and executes a system initializing routine.

Figure 5:
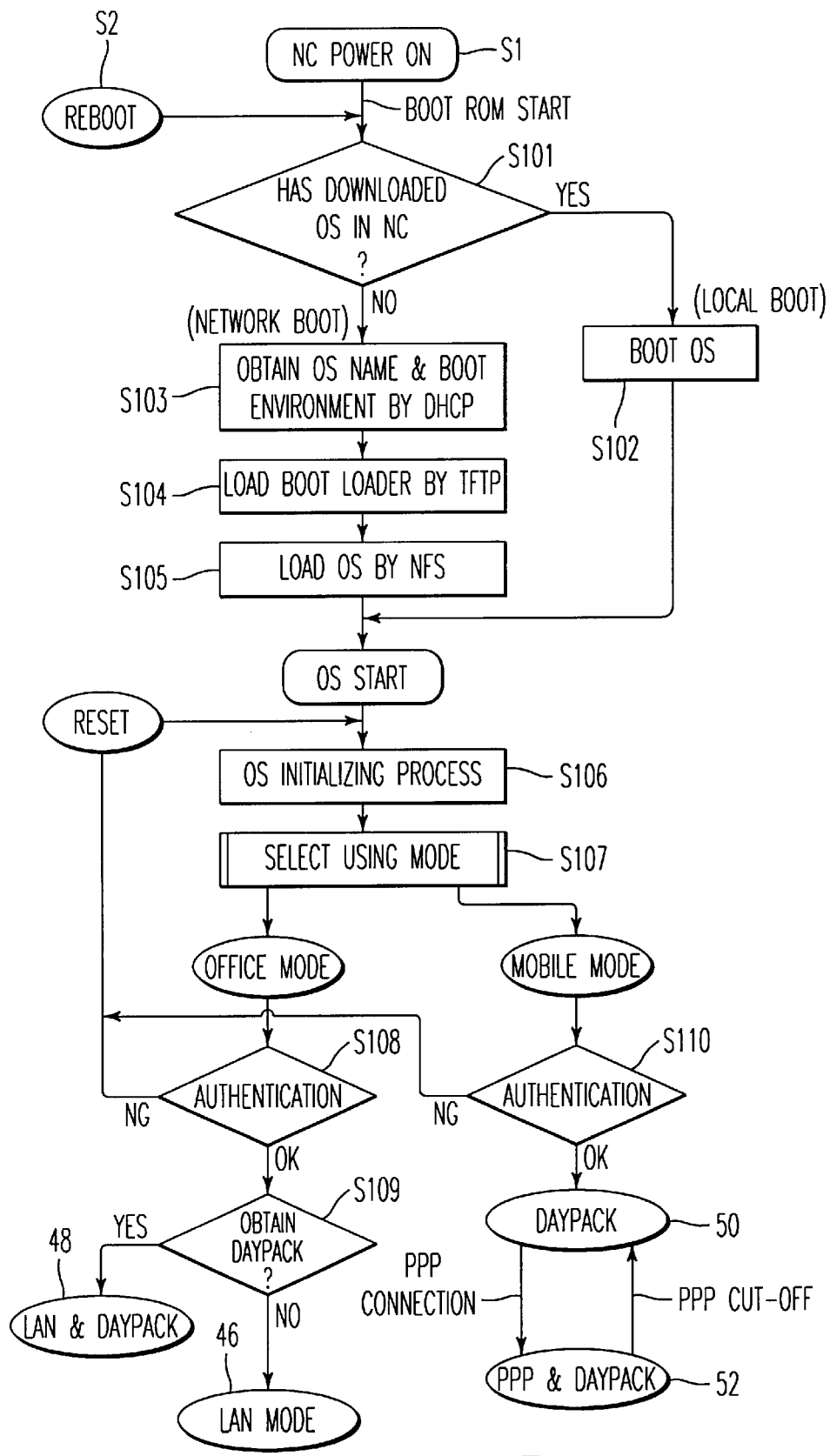
FIG. 5 is a flow chart illustrating an OS initializing process according to the present invention.

FIG. 5 is a flowchart for the initializing process when a LAN is using Transmission Control Protocol/Internet Protocol ("TCP/IP"). When the network computer (12) is powered ON (Step S1) or a reboot operation is executed (Step S2), a boot program stored in ROM in the network computer (12) starts. Initially, the boot program determines whether or not the OS exists in the OS storing area of the local storage (24) in the network computer (12) (Step S101).

If the OS has been stored in the local storage (24), the OS is booted from, for example, a built-in flash memory in the local storage (24) for executing a local boot (Step S102), the OS is started, and control passes to step (S106).

If the OS has not been stored in the local storage (24), the boot program stored in the ROM acquires an OS name, Internet Protocol ("IP") address and minimum booting environment for generating the OS through Dynamic Host Configuration Protocol ("DHCP") from the server computer (Step S103).

Then, a boot loader is loaded from the server computer through Trivial File Transfer Protocol ("TFTP") for transferring the system control to the boot loader (Step S104). The boot loader executes a booting operation by loading the OS from the server computer through Network File System ("NFS") (Step S105). The initializing process of the OS is then started (Step S106).

In the initializing process, the network environments for use by the OS, such as selection of devices, are defined. After the definition of the environments, a mode of use selection process is executed (Step S107).

In the mode of use selection process, the OS first determines whether or not a daypack exists with an ownership right, and whether or not the LAN is able to use the daypack. In accordance with the results, a default value for the mode of use is determined. The default value determined is displayed on a log-in dialog screen of the network computer. If local storage exists including the daypack having an ownership right during the selection process, the default value for the mode of use is set to "mobile mode". Next, the usability of the LAN is determined by checking receptions of OFFER packets in responding to a broadcasting of a DISCOVER packet of Dynamic Host Configuration Protocol ("DHCP"). If an OFFER packet is received, it is recognized that the LAN is available for use, and the default value of the mode of use is set to "office mode".

As explained above, when a usable local storage such as the daypack exists, either the "mobile mode" or the "office mode" is displayed on the log-in dialog as the default value in responding to the usability of the LAN. If a change of the mode of use is specifically instructed on the log-in dialog, it changes to the instructed mode of use.

When the displayed setting is approved by pressing an OK-button on the log-in dialog, the using mode is fixed and starts the setting process. The indicator for the fixed mode of use is displayed on the screen. On the other hand, if the local storage does not exist or the ownership of the daypack has not been assigned even when the local storage exists, the usability of the LAN is determined without determining the default mode.

If it is determined that the LAN is usable, the default value for the mode of use is set to "office mode". When "office mode" is displayed on the log-in dialog, the "mobile mode"is invalid. Thus, when the local storage does not exist or the ownership of the daypack in the local storage is not assigned, the "office mode" is selected.

At the Step S107, when the mode of use is set to "office mode" or "mobile mode," the respective user approving processes are executed on the bases of the input user name and password during the log-in dialog (Step S108 and Step S110).

If the user does not approve in the approving process, the selecting process for the mode of use is reset and control returns to the OS initializing process (S106).

When the user approving process in "office mode " is successful, it is determined whether or not the ownership of the daypack has been obtained (Step S109). If the daypack has been owned, the mode is set to (LAN+daypack) mode (48). If no ownership for the daypack is established, the mode is set to the LAN mode (46).

If "mobile mode" has been selected, and the user is approved in the approving process, the mode is set to "daypack mode" (50). The mode moves between the daypack mode (50) and the (PPP+daypack) mode (52) in response to the PPP connection/disconnection operation by an operator.

As discussed previously, the network computer can perform the same data processing on-line by downloading the necessary resources into local storage from the server computer through the network, even when it goes off-line. When the network computer returns online, it needs to upload the updated data in the network computer for synchronization between the resource replica of the network computer and the resources of the server computer. The downloading/uploading of the resources of the network computer is performed by the synchronous processing portion (23-1) downloaded into the OS (FIG. 1).

Figure 6:
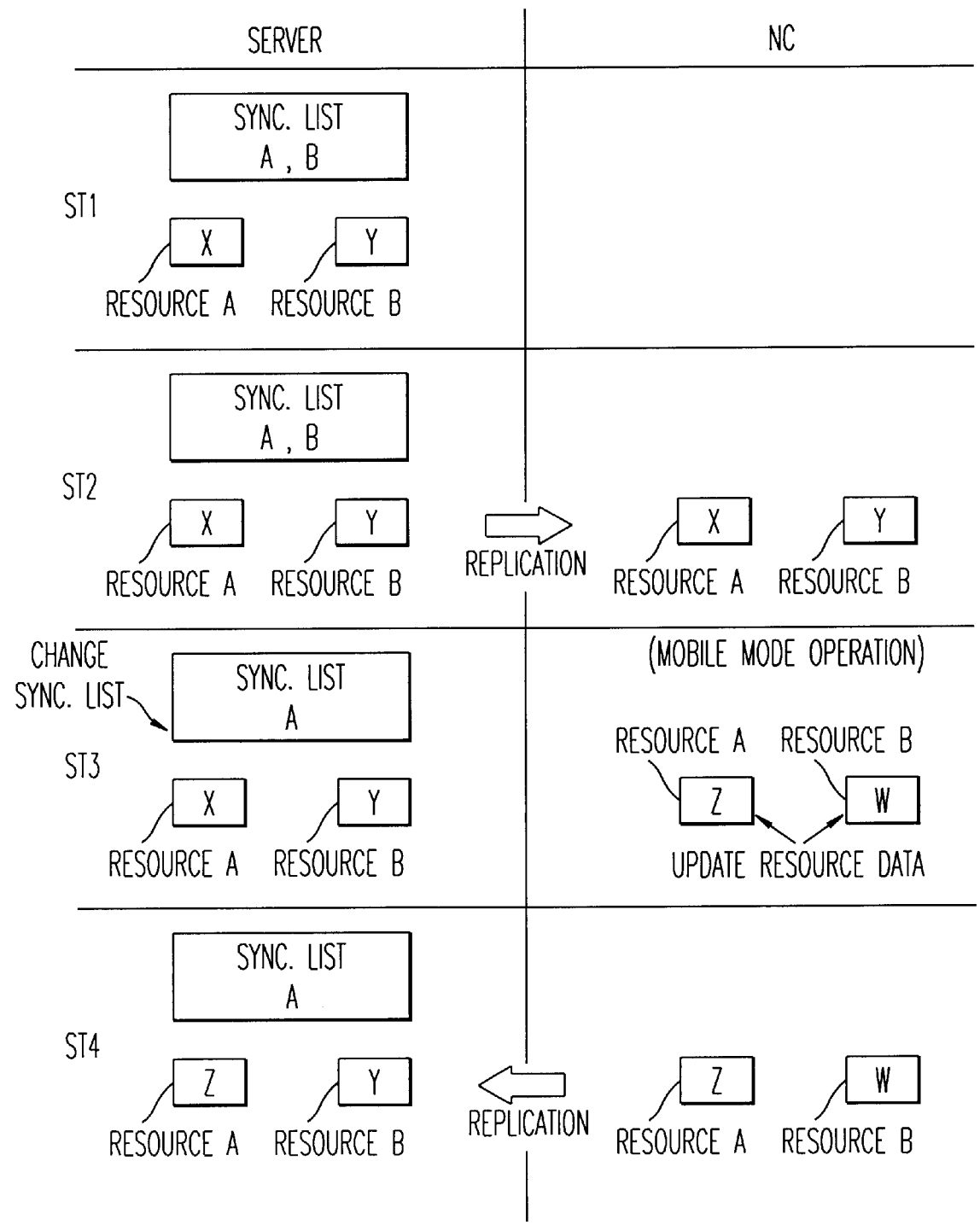
FIG. 6 is a diagram illustrating a replication process between a server and a network computer which is performed by using a synchronization list of the server computer.

However, a problem exists in the downloading/uploading of the resources after the mobile operation of the network computer. Inconsistencies appear between the resources of the server computer, and the replicas of the mobile mode network computer caused by changing the synchronization list in the server during the off-line operation of the server computer. FIG. 6 illustrates the appearance of exemplary inconsistencies.

In FIG. 6, the synchronization list of the network computer has initially designated the resources A and B as the synchronizing objects. Data X and data Y are respectively included in the resources A and B (Stage ST 1). Referring to the synchronization list, the replication process is executed, and the respective resource replicas of the resources A and B are produced in the network computer (Stage ST 2). At this stage, the data X in the resource replica A in the network computer is synchronous to the data X of the resource A in the server. Similarly, it is the same between the data Y in the replica B and the one of the resource B.

The network computer then goes off-line and performs a mobile mode operation. Consequently, the content of the resource replica A of the network computer changes to data [Z]. Similarly, the content in the resource replica B is updated to data [W]. During the off-line mode operation of the network computer, the synchronization list in the server computer is also updated by a system manager. For example, the resources B are deleted from the list and only the resource A remains as the synchronous object (Stage ST 3).

When the network computer (NC) returns on-line to the network, replication of the resources is performed by referring to the synchronization list in the server computer. At this stage, the resources B have already been deleted from the synchronization list of the server. Consequently, the replication for the resources B is not performed, and only the data [Z] in the resources replica A is replicated in the server. The updated data [W] in the resource replica B remains in the network computer without executing the replication. The data [Y] in the resource B also remains in the server computer without performing the replication. As a consequence, an inconsistency of the data appears between the resource in the server and the resource replica (Stage ST 4).

The network computer according to the present invention solves this problem. As shown in FIG. 1, the network computer (12) according to the present invention is characterized in that it includes a replica list (24-1). The replica list (24-1) is a copy of the synchronization list (21-1) of the server computer (11). During the replication of the resources, both the synchronization list (21-1) of the server and the replica list (24-2) of the network computer are referenced. It becomes possible to control the replication to resolve the problem discussed above.

Figure 7:
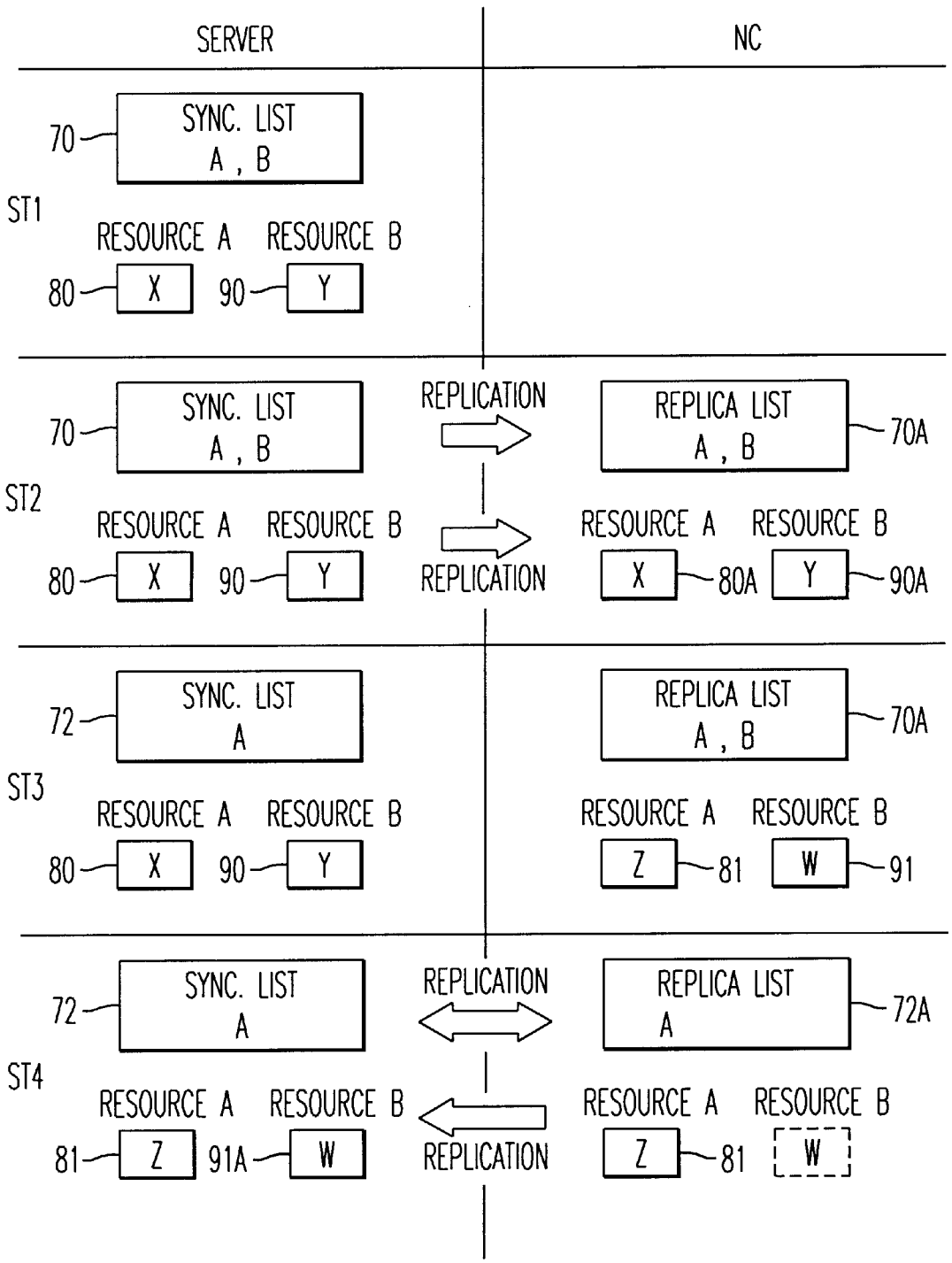
FIG. 7 is a diagram illustrating a replication process between a server and a network computer which is performed by using a synchronization list in the server computer and a replica list in the network computer, according to the present invention.

FIG. 7 illustrates an exemplary synchronizing method for a network computer according to the present invention. As in FIG. 6, the synchronization list of the network computer initially designates the resources A and B as the synchronizing objects. Data X and data Y are respectively included in the resources A and B (Stage ST 1). Referring to the synchronization list, the replication process is executed, and the respective resource replicas of the resources A and B are produced in the network computer (Stage ST 2).

As a result of the mobile mode operation of the network computer during an off-line state, the data content in the respective resource replicas A and B of the network computer are changed to data [Z] and [W], respectively. During an off-line mode operation of the network computer, the resource B has been deleted from the synchronization list (Stage ST 3).

At the stage of execution of the replication process when the network computer (NC) is returning on-line to the network, the replica list (71) in the NC is compared to the synchronization list (70) in the server computer. As a result of this comparison, the NC determines that the resource B has already been deleted from the synchronization list (70) and only the resource A remains as the synchronizing object.

When the synchronization process portion in the NC detects an inconsistency between the synchronization list (70) and the replica list (71), it changes the replica list (71) to coincide with the synchronization list (70). Thus, the resource replica B is deleted from the replica list (71) and only the resource replica A remains in it. As for the updated data [W] in the resource replica B, the data [W] is uploaded to the server before it is deleted it from the replica list (71). Then the updated data in the resource A is replicated by reference to the changed replica list (Stage ST 4). It is also possible to designate a specified process for the synchronization process portion (23-1) to achieve an optional designation. A system manager can add an option in the synchronization list of the server.

FIG. 8 illustrates an exemplary structure of a synchronization list that includes an optional designation. In this example, the structure of the synchronization list includes a name of a synchronizing object resource and optional information for designating an updated mode. The optional information designates priority for the respective data. Thus, when an inconsistency is detected between the updated data in the server and the updated data in the NC, the optional information designates which of the updated data should have priority for a replication between the server and the NC. A priority is designated for each of the synchronizing object resources. For example, in FIG. 8, the optional information [S] designates that the update of the server data should have priority to the NC data. Accordingly, the updated data in the server is first downloaded to the network computer (NC) for updating the corresponding data in the NC.

The optional information [NC] designates that the uploading of the updated data in the network computer (NC) has priority to the updated data in the server. Thus the updated data in the NC should be uploaded to the server for changing the corresponding data in the server in higher priority than the updated date in the server.

The optional information [UP] designates that if the same data has been updated both in the server and the network computer (NC), the latest data should have priority. Thus, after comparing the update time for the data in the server and the date in the NC, the data having the latest update time is uploaded or downloaded.

Figure 9:
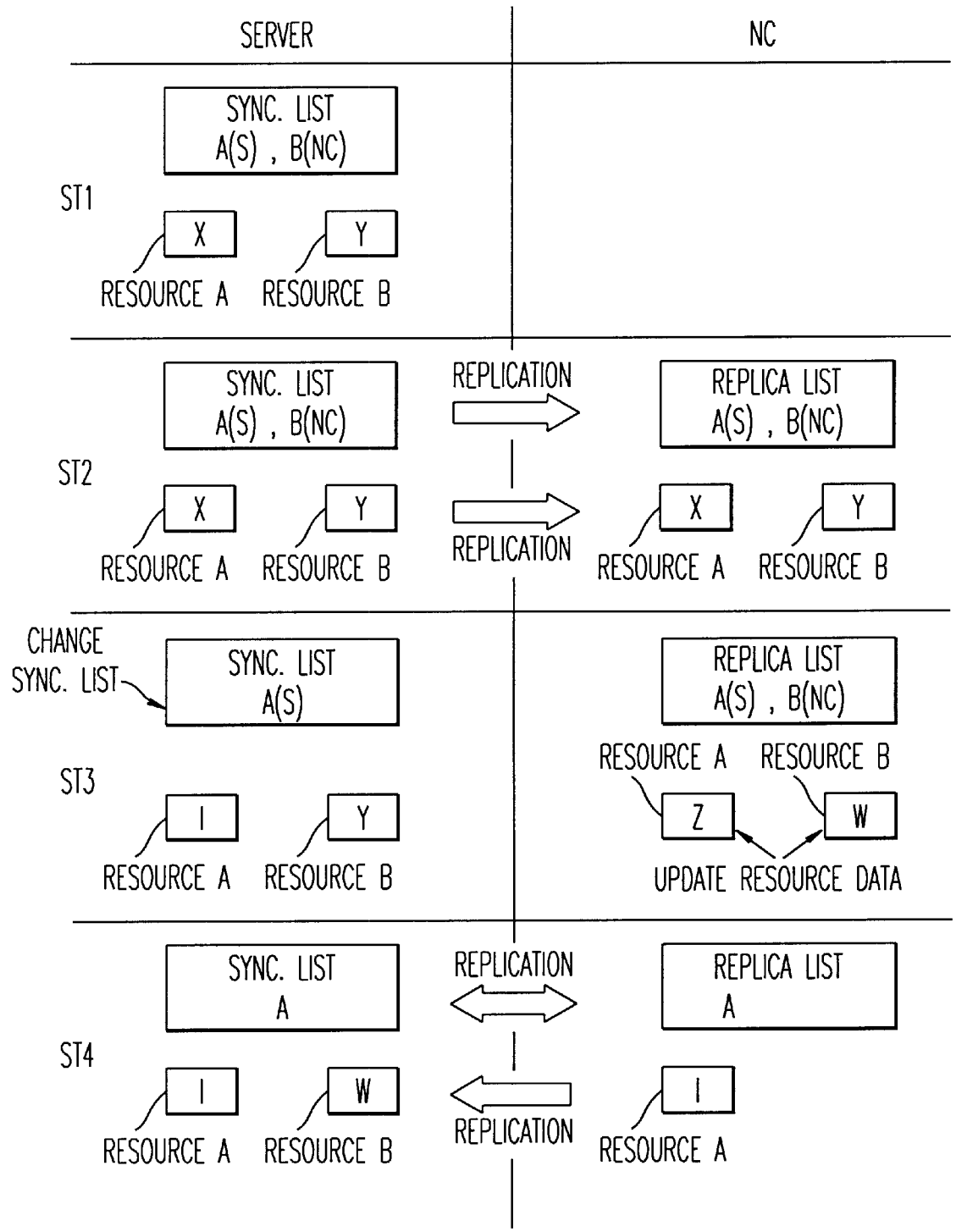
FIG. 9 is a diagram illustrating a first embodiment of the replication process between a server and a network computer which is performed by using the optional synchronization list of FIG. 8 and a replica list in the network computer, according to the present invention.

FIG. 9 illustrates an embodiment of an exemplary replication process using optional information as discussed above. At the first stage (ST 1), the synchronization list of the server computer designates resources A and B as the synchronizing object resources. The resource A includes the first optional information [S], and the resource B includes the third option [NC]. Data X and data Y are respectively included in the resources A and B (Stage ST 1).

The replication process is executed, and both the replica list and the respective resource replicas of the resources A and B are produced in the network computer (Stage ST 2). As a result of the mobile mode operation of the network computer off-line, the data content in the respective resource replicas A and B of the network computer are changed to data [Z] and [W], respectively. During off-line operation of the network computer, the resource B(NC) is deleted from the synchronization list. Further, the resource A has been updated from [X] to [I] (Stage ST 3). When the NC is connected to the server through the network, the replication is performed (Stage ST 4). The replication process is shown in the flowchart in FIG. 1.

Figure 11:
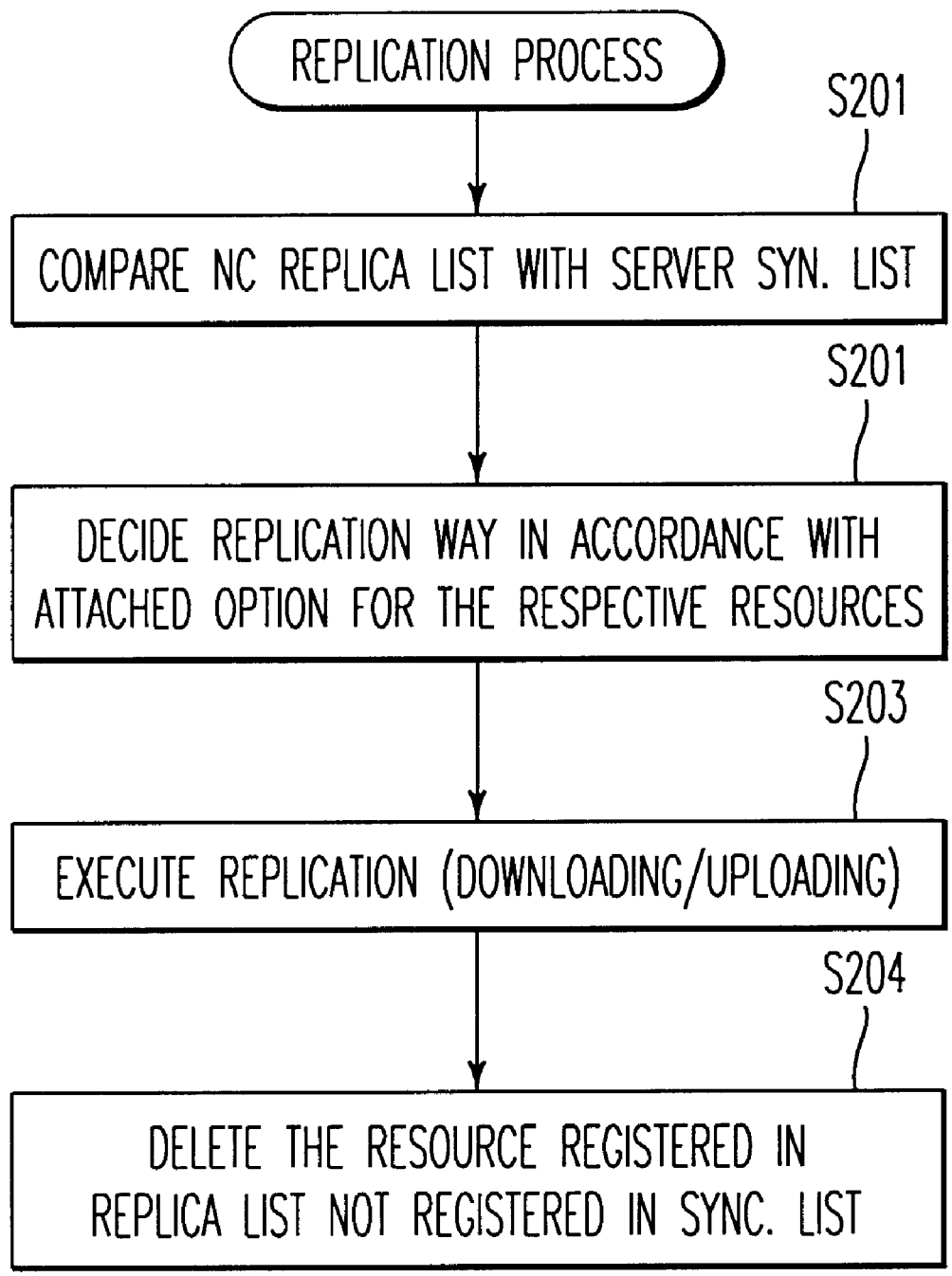
FIG. 11 is a flow chart illustrating the replication process that is performed by using the synchronization list with options and the replica list in the network computer, according to the present invention.

As shown in FIG. 11, first the replica list (92) in the NC is compared to the synchronization list (90) in the server for referencing to the updated states. (Step S201). By this reference, the synchronous processing portion of the NC can determine the existence of the synchronizing object resource B in the server side synchronization list, while it existed in the NC side replica list. The synchronous processing portion (23-1) (FIG. 1) determines the method of replication for the respective resources in accordance with the resource name and the attached optional information designated in the replica list (Step S202).

As explained above, in the designation of the optional information, the updated data for the resource A in the server has priority. Accordingly, the synchronous processing portion (23-1) executes a replication for downloading the updated data in the server side to the network computer. Thus, the resource replica A is changed from [Z] to [I]. Since the updated data for the resource B in the network computer has priority, the synchronous processing portion (23-1) executes a replication for uploading the updated data in the NC side to the server computer. The content in the resource replica A is then changed from [Y] to [W] (Step S203). The synchronous processing portion (23-1) then deletes the resource B from the replica list since it has already been deleted from the synchronization list in the server (Step S203).

It is possible to download the resource data in the server side, with updated time information for the respective data, from the server to the network computer. By referencing the downloaded time information and the latest update time, the network computer can determine whether or not the downloaded data in the resource replica has been updated during the off-line operation of the NC. For example, in FIG. 9, the server downloads the resources with the time information included. During the off-line state of the NC, i.e., at the stage ST 3, even if the data in the server side resource B has changed from [Y] to [H], the NC can determine the change by comparing the updated time information at the replication stage ST 4.

Figure 10:
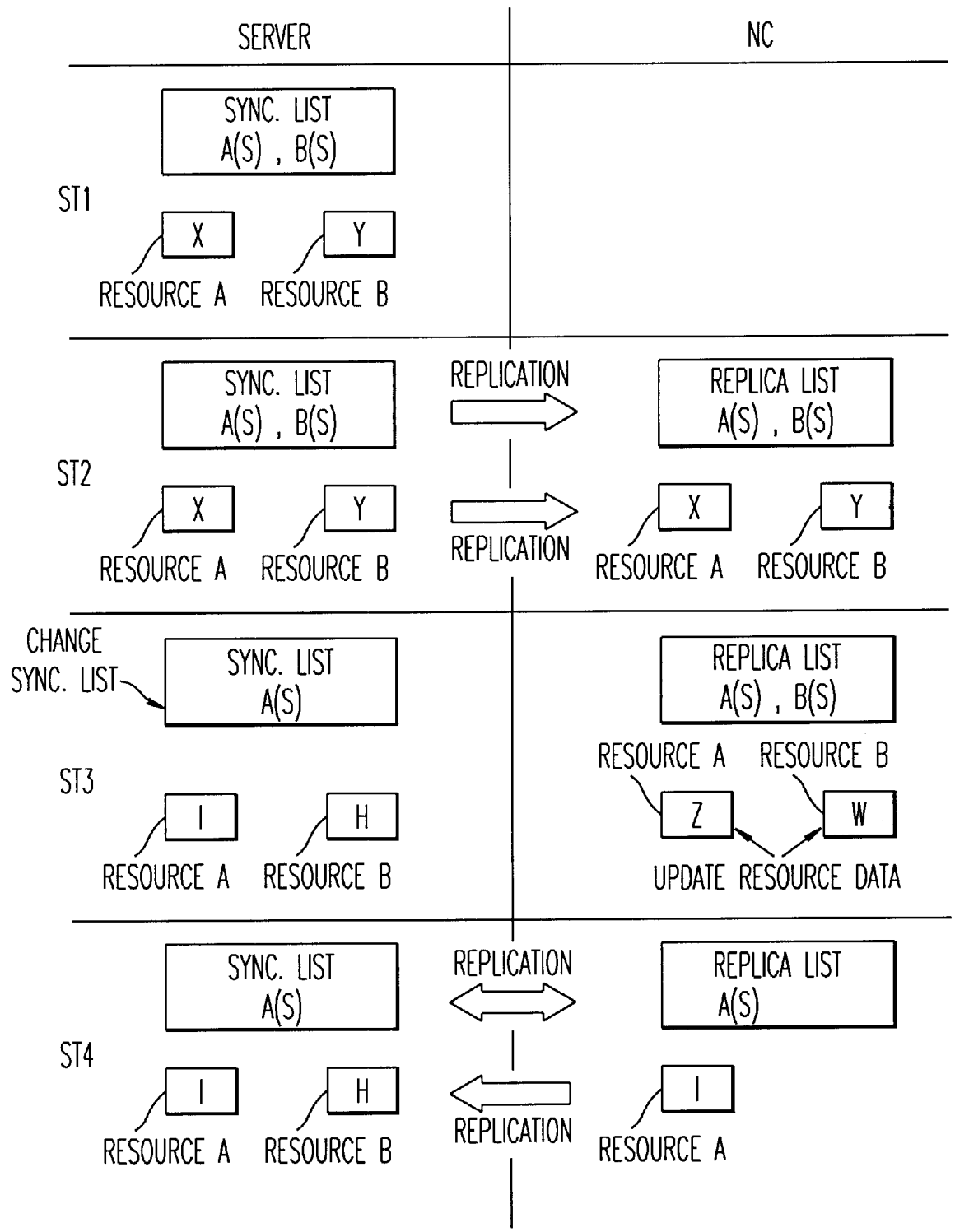
FIG. 10 is a diagram illustrating a second embodiment of the replication process between a server and a network computer which is performed by using the optional synchronization list of FIG. 8 and a replica list in the network computer, according to the present invention.

FIG. 10 illustrates another embodiment of the replication process with using optional information according to the present invention. In this embodiment, the synchronizing object resources A and B in the server side synchronization list both attach the optional information [S]. Thus, the NC has priority of replication for both of the resource replicas (stage ST 1). By downloading the first replication, the resource replicas A and B are produced in the network computer (Stage ST 2).

During off-line operation of the network computer, the resource replicas A and B change from [X] and [Y] to [Z] and [W], respectively. The server computer changes the data content of the resource B from [Y] to [H]. Further, the resource B in the synchronization list of the server is deleted (Stage ST 3).

When the network computer returns on-line, the synchronous processing portion of the NC executes the replication process using the NC side replica list and the server side synchronization list. In determining the synchronizing object, the resource in the server side has priority in accordance with the optional information. Accordingly, the updated data in the server resource A is downloaded into the NC side resource replica A. Thus, the NC side resource replica A is changed from [Z] to [I]. However, since the server side resource B has already been deleted from the synchronization list, the synchronous processing portion of the NC does not download the updated data in the server resource B to the NC, but deletes the resource replica B in the NC as instructed by the optional information (Stage ST 4).

As explained above, the network computer according to the present invention is characterized in that it has a local storage for storing a replica list of a server side synchronization list as well as resource replicas in the server side resources. Also, the method according to the present invention is characterized in that the replication processes for the resources are determined with reference to the server side synchronization list and the replica list.

According to the present invention, a reliable and flexible network computer system, and a mobile operation network computer that can resolve inconsistencies between the server side resources and the downloaded NC resource replicas has been described.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. A network computer system, comprising:

a server computer;

a plurality of network computers;

at least one network for coupling between the server computer and the plurality of network computers, wherein the server computer stores original resources having data including at least an OS and a synchronization list for identifying synchronous objects for synchronization of the original resources to each one of the plurality of network computers, the OS includes a synchronization process for the synchronization of the original resources, and wherein each of the plurality of the network computers includes a local storage for storing downloaded replicas of the original resources from the server computer to the network computer and a downloaded replica list of the synchronization list of the server computer for identifying synchronous objects for executing the synchronization, the synchronization list includes optional information for determining execution of the synchronization between the server computer and the local storage, and the local storage is used to store the replicas of the resources stored in the server computer and the replica list of the synchronization list stored in the server computer;

means for operating the each of the plurality of network computers by using resource replicas stored in the local storage without accessing to the server computer;

means for comparing the synchronization list in the server computer and the replica list in the local storage at a synchronization stage in an on-line connection to the server computer; and means for executing the synchronization between the resources in the server computer and the resource replicas in the each of the plurality of network computers using a result of a comparison by the comparing means.

2. The computer system according to claim 1, wherein the synchronization executing means includes means for determining execution of the synchronization by determining whether the synchronization list in the server computer is changed after an initial synchronization of resources to the each one of the plurality of network computers.

3. The computer system, according to claim 2, wherein the synchronization executing means updates the replica list in the local storage by downloading the contents in the synchronization list when it is modified off-line.

4. The computer system according to claim 3, wherein the synchronization list includes synchronizing object resources and an optional information included for each of the respective resources for determining which one of the respective resources has priority for synchronization when it is determined that data in the server computer and the local storage have been modified off-line.

5. The computer system according to claim 4, wherein
the synchronization executing means determines execution of synchronization by determining modifications of the data in the server computer and in the local storage using the optional information.

6. The computer system according to claim 5, wherein
the synchronization executing means determines execution of the synchronization by using the optional information in the synchronization list.

7. The computer system according to claim 6, wherein the computer system is operable in a first mode operation and a second mode operation, wherein the first mode operation uses resource replicas stored on the local storage during an off-line state from the server computer; and the second mode operation is performed by connecting the server computer through an on-line network.

* * * * *